United States Patent Office 3,142,979
Patented Aug. 4, 1964

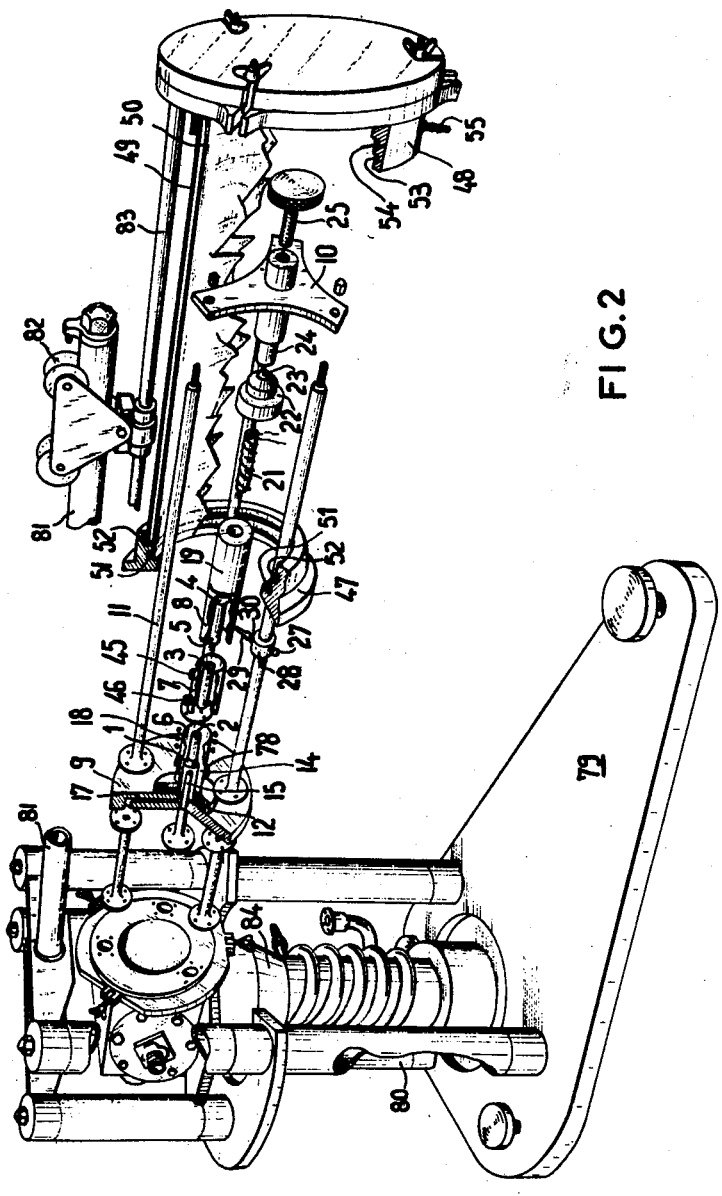

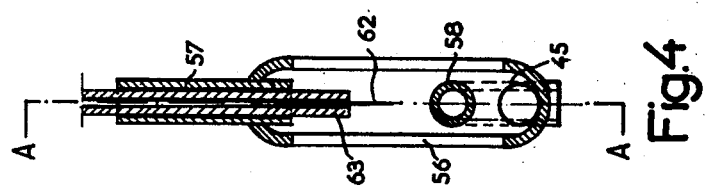
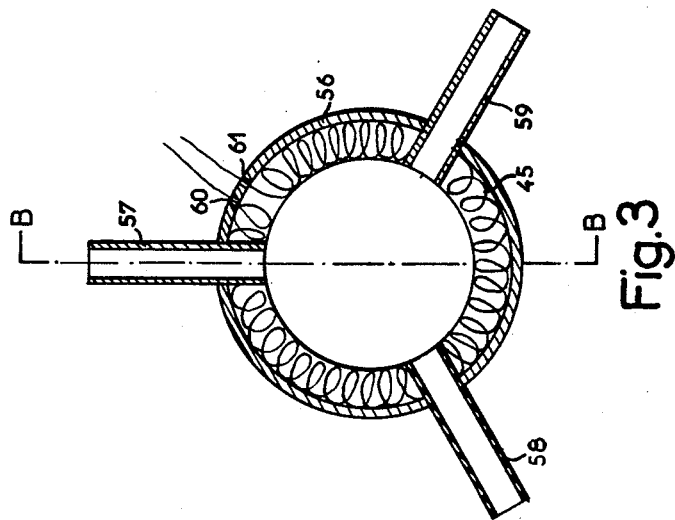

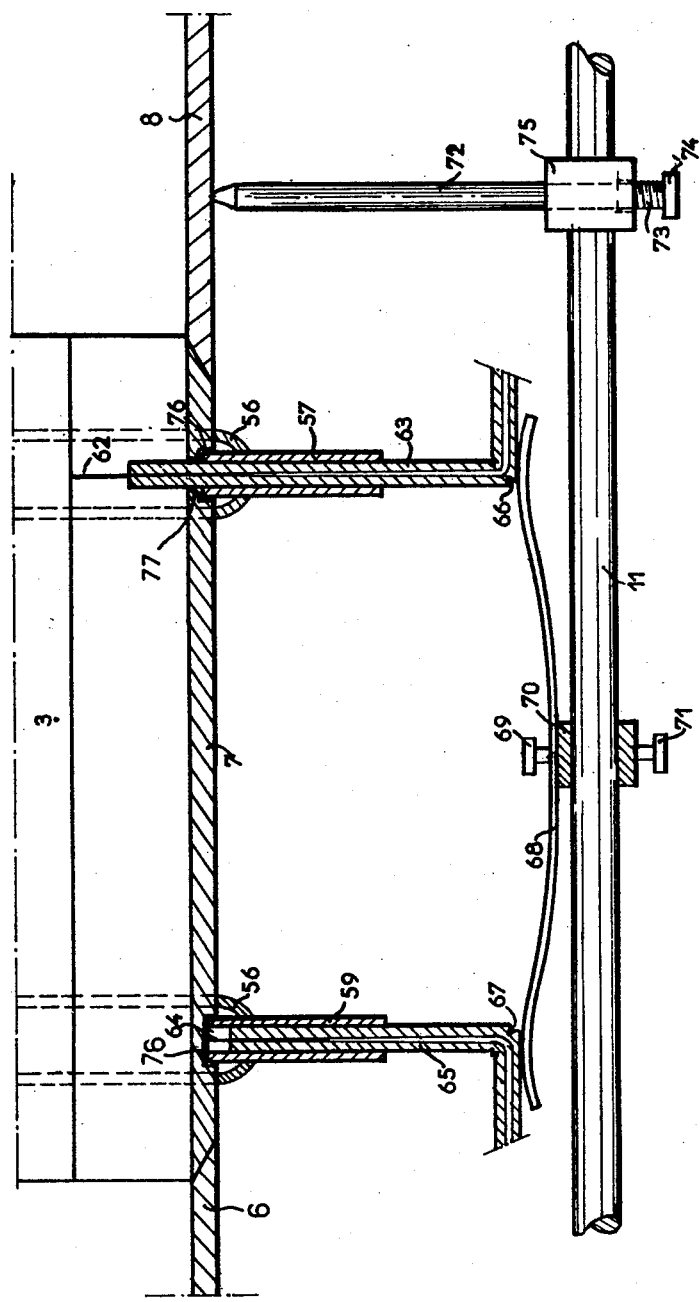

3,142,979
APPARATUSES FOR MEASURING THE COEFFI-
CIENT OF THERMAL CONDUCTIVITY OF
SOLID MATERIALS
Paul Cogez, Montrouge, Jacques Humbert, Viroflay, and
Claude Gewiss, Paris, France, assignors to Commis-
sariat a l'Energie Atomique, Paris, France
Filed Apr. 6, 1960, Ser. No. 20,447
Claims priority, application France Apr. 15, 1959
7 Claims. (Cl. 73—15)

The measurement of the physical properties and in particular of the thermal conductivity of refractory materials susceptible to be used in an atomic reactor is of prime importance. Effectively, on the one hand this physical property is indispensible to the designers of atomic piles and, on the other hand, it is interesting to study the variation of the thermal conductivity as a function of the heterogeneousness of the material, therefore of the quality of its manufacture, and of the influence of ulterior treatments: such as nuclear irradiations, corrosions, thermal cycles.

The fundamental laws regulating this property are derived from the equation of Fourier, which can be expressed:

$$\frac{dQ}{d\theta} = -KS\frac{dT}{dL}$$

meaning that the quantity of heat Q which in a unit of time, $\theta$, flows across a surface S is proportional to the temperature gradient ($T_1-T_2$) measured along the path L followed.

Distinction is made between two main features:

The variable heat flow condition, where the temperature at a given point of a body is a function of time, The static condition, or permanent, where the temperature at a given point of the point is constant.

There are therefore two methods for accurately measuring the coefficient of thermal conductivity, according to which it is necessary to observe certain conditions:

The sample must have a geometrical shape in order to precisely define a constant section S over a length L; the prism and the cylinder satisfying this condition.

The sample must be placed between a hot source and a cold source in order to create a "heat flow";

Means for precisely measuring the temperature must be available;

Finally, it is necessary that all the calories entering at one end of the sample travel fully to the other end.

The variable heat flow method, besides involving complicated calculations in order to solve the complete equation, makes it necessary to use an elaborate apparatus, having a thermal source which varies as a function of time. These inconveniences do not allow the use of the method for rapid, faithful and precise measurements.

The steady heat flow method involves the creation of a regular flow of calories through the sample and measuring it, i.e. the number of calories crossing a section S of the sample per second, and the fall of thermal potential. This measurement can be made in an absolute manner, i.e. by the direct measurement of the power dissipated at the hot source, or received at the cold source, or by a comparative method with reference to a standard.

The apparatus using the absolute method must have a rigorously adiabatic thermal source. This necessary condition precludes any simple and easily operated apparatus. In fact, either on the one hand these realizations are of little precision, e.g. where the thermal source is an electric resistor surrounded by a second shielding resistor, or on the other hand, they necessitate samples and screens of a very specific shape (cylinder, sphere, spheroid) which are very often expensive or impossible to manufacture as in the case of refractory materials where it necessitates a special molding that does not allow to revert to the original properties of the industrial material.

The comparative steady heat flow method is the most interesting to study the industrial materials, because it allows the use of a sample of geometrically simple shape, cylinder or prism for instance.

The principle is as follows: a steady rate of heat flow is established through a thermal chain made up of two reference test bars hereinafter called "witnesses," which hold between them the sample to be studied. The thermal conductivity of these witnesses is periodically checked in the apparatus by means of standard test bars.

The so constituted thermal chain is heated at one end and cooled at the other. The thermal gradients which result are analyzed by means of a series of thermocouples placed on the three elements.

According to an object of the invention, the same temperature gradients are maintained in a concentric screen, by means of auxiliary compensating resistors, the whole of the apparatus being placed in a vacuum. In such a layout, it is possible to consider that the losses due to radiation, conduction and convection, are negligible and that the same thermal flux crosses successively each of the three elements of the thermal chain.

$Q$ is the quantity of heat in calories per second (it is considered that the flux crossing the sample is the same as that crossing the witnesses), $K$ is the average coefficient of thermal conductivity, $\Delta T$ is the thermal gradient in ° C. over the length $l$, $l'$ is the spacing between the thermocouples in cm., $S$ is the section of the test bar in cm.$^2$, having defined various symbols as above, and if the index 1 is applied to the characteristics of the heated witness, and the index 2 to the characteristics of the cooled witness, the characteristics of the test bar to be measured bearing no index, we get, considering that the flux crossing the sample is the same as that crossing the witnesses, the following equation:

$$Q = K_1\frac{\Delta T_1.S_1}{l_1} = K\frac{\Delta T.S}{l} = K_2\frac{\Delta T_2.S_2}{l_2}$$

The determination of the co-efficient K of the sample is based on the calculation of the thermal flux crossing the sample, starting with the measurement of the temperature gradient on one of the witnesses, the measurement of the properties of that witness and the knowledge of the conductivity of that witness. Starting from this flux, and from the thermal gradient read on the sample, we can then calculate the coefficient K.

Repeating the same operation in respect of the other witness we obtain another experimental value of K and we can make an average of the two calculated values.

These embodiments are foreseen for the measurements of thermal conductivity between 50° C. to 250° C., that is to say, in a temperature range which is sufficiently wide, to determine by extrapolation, the thermal conductivity of a given material for a temperature outside the above range (as are sometimes encountered in a nuclear reactor); further they allow in the case of irradiated samples, to make the measurements by avoiding a premature "cure" of the sample. However, these realizations have the grave inconvenience of not being universally used and recognized.

The provision of a tubular screen within which are maintained the same temperature gradients as those prevailing in the thermal chain, by means of auxiliary compensating resistors, have involved restriction of the materials of the sample, since the thermal conductivity of the screen elements should be close to those of the sample and of the witnesses, respectively.

Thus, for example, in the case of the measurement of the thermal conductivity coefficient of a sample of glucine, use is made of a cylinder of stainless steel enveloping the sample and the witnesses; this screen being less conductive thermally than the glucine, it is easy by localized heating to adjust the thermal gradients. But this system of regulation cannot be applied with several refractories which are less conductive than the stainless steel. It is then necessary, for these materials, to change the screen and sometimes, consequently, the material of the witnesses, which necessitates a complete dismantling of the layout of the apparatus.

Finally, this type of layout has other shortcomings inherent to its conception: the delicate and very precise adjustment of the thermal gradients of the screen by means of compensating resistors, the lack of compensation for the parasitic expansions and variations in length of the samples, the difficulty of centering the thermal chain, and the thermal losses occurring at the hot end.

Another object of the present invention is an improvement to the apparatus for measuring the coefficient of thermal conductivity of solids, which reduces the above inconveniences.

The improvement is characterized in that on the one hand, the screen surrounding the sample and the witnesses is divided in three parts, which are mobile and adjustable, each being of a material having the same coefficient of thermal conductivity or a coefficient which is slightly inferior to that of the element that it surrounds, and, in that on the other hand, means are provided to recapture the parasitic expansions and variations in length of the samples, in order to cancel out the effect of expansions during the course of the rise in temperature, for exactly centering the thermal chain and for cancelling out the thermal losses at the hot end:

Referring to the schematic FIGURES 1 to 5 of the drawing, two embodiments of an improved apparatus according to the invention will be described.

FIG. 2 shows an exploded perspective view of the apparatus for measuring the coefficient of thermal conductivity of solids, according to the first embodiment of the invention.

FIG. 3 shows a section along line A—A of the FIG. 4, of an interchangeable heating annulus, according to a second preferred embodiment of the invention.

FIG. 4 represents a section along line B—B of the FIG. 3 of the same interchangeable heating annulus.

FIG. 5 is a partial section view of the pressure system of the thermocouples and of the centering fingers, according to a second embodiment of the invention.

On the above mentioned figures, only the elements which are believed to be necessary to a good understanding of the invention are shown. Also on these figures the corresponding parts of the various embodiments shown bear identical reference numerals.

Figure 1:
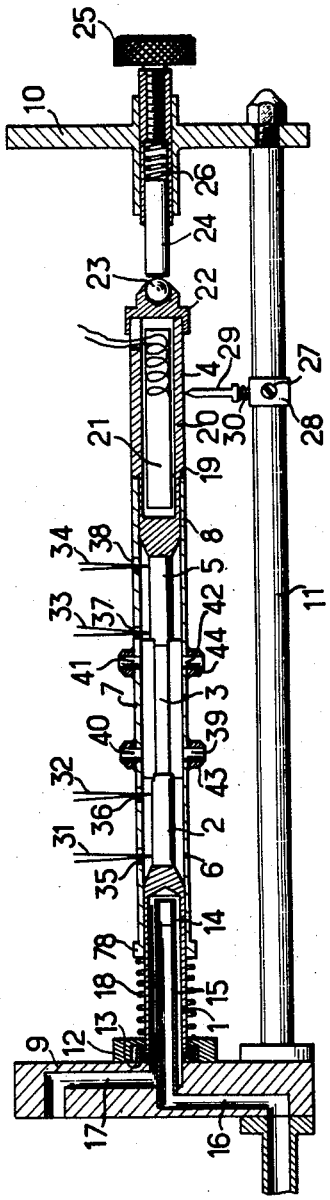
FIG. 1 shows a schematic section of a thermal chain, according to a first and preferred embodiment of the invention.

In the first embodiment of the invention, it can be seen, on FIGS. 1 and 2, that the thermal chain comprises a cooled pusher 1, of which one of the ends forms the "cold" witness 2 of the sample 3, and a heating pusher 4, of which one end forms the "hot" witness 5. Removable and adjustable screens surround the thermal chain. The screen 6 surrounds the "cold" witness 2, the screen 7 the sample 3 and the screen 8 the "hot" witness 5.

This thermal chain and its screens are held in place by a frame that comprises: a support 9, located at the cold end, and a star-shaped support 10, located at the hot end, linked together by three rods, such as 11.

The cooled pusher 1 is attached to the support 9 by means of a retaining ring 12 secured to the latter by means of set screws not shown in the figures. A ring or seal 13 is compressed by the tightening of the said screws to ensure a fluid tight link between the support 9 and the cooled pusher 1. The pusher 1 also has a longitudinal cavity 14, in which is inserted a tube 15 that communicates with a cavity 16 provided in one branch of the support 9. Also, the cavity 14 communicates with a cavity 17 provided in one of the other branches of the support 9.

The screen 6 is in sliding contact with the cooled pusher 1 and rests at its extremity 78, located on the side of star-shaped support 9, on a calibrated spring 18 that holds it in position. The screen 7 is located between the screen 6 and the screen 8. (FIGS. 1 and 2.) The latter is in sliding contact with the wall of an annular recess 19 of the heating pusher 4. The heating pusher 4 has a cavity 20 into which is introduced a heating element 21. The open end of this heating pusher 4 is provided with the plug 22 that has embedded in its head, a ball 23 of refractory material. Bearing against this ball 23, there is a tightening pusher 24 of refractory material and cylindrical shape, received in a sleeve secured to star-shaped support 10, into which it is freely slidable. A tightening screw 25, serves, by means of calibrated spring 26, to hold in place the thermal chain and its screens.

On the rods, such as 11, are securely adapted, by means of screws, such as 27, some riders 28. These riders 28 having centering fingers, such as 29, which are applied to the thermal chain by means of calibrated springs, such as 30. These centering fingers 29 are therefore used for the exact centering of the thermal chain.

Some thermocouples are located at intervals along the thermal chain, among these some, such as 31, 32, 33 and 34 are placed on the surface of the witnesses 2 and 5; the screens 6 and 8 have small longitudinal apertures, such as 35, 36, 37 and 38, allowing for the passage of these thermocouples. The other thermocouples are mounted internally of the centering fingers. Four of these provide readings of the temperatures at the surface of the screens 6 and 8 and are located to coincide with the thermocouples 31, 32, 33 and 34. Four others allow readings of the temperatures to be obtained at the surface of the sample and therefore penetrate through the screen 7 through holes such as 39, 40, 41 and 42; finally two others allow to obtain readings of the temperatures at the surface of the screen 7 and are located in positions coinciding with those of the four previous thermocouples.

The screen 7 has two collars of refractory material 43 and 44 around which are wound two auxiliary resistors 45 and 46 allowing an adjustment if the need arose of the temperature gradient of the screen 7.

On FIG. 2 are shown the plate 79 supporting the apparatus, the supporting legs 80 between the top part of which is adapted the supporting arm 81; at the end and at the start of every experiment, it is possible to slide horizontally the whole part of the apparatus that is located to the right of the support 9 by means of a block of pulleys 82 carried by the rod 83 supporting the said part and rolling on the supporting arm 81.

A water jacket envelops the assembly described with respect to FIGURE 1; it comprises an annular end wall 47 and an annular end wall 48 holding between them concentric two glass tubes 49 and 50. Fluid tight sealing between the glass tubes 49 and 50 and end walls 47 and 48 is realized by the compression of resilient sealing rings 51, 52, 53 and 54. The feeding of the water in the jacket is done through a tube 55 carried by end wall 48; the discharge takes place through a similar tube not shown in the figure and located on top of the annular end wall 47.

The pushers 1 and 4, the witnessses 2 and 5 and the screens 6 and 8 are made of soft iron containing less than 0.03% of carbon, of sulphur, and of silicon. The sample 3 and the screen 7 are made of the same material. If, for technical reasons, the screen 7 cannot easily be made of the same material as sample 3, it can then be made of a material having a thermal conductivity similar or very nearly so, but always less than that of the sample. In the case where the material of the screen 7 has a coefficient of thermal conductivity that approaches but is less than that of the sample, the equivalence of the thermal gradient is realized through the use of the auxiliary resistors 45 and 46. The tightening pusher 24 is of refractory material.

The apparatus also comprises a pumping assembly 84 located between the supporting legs 80 of the apparatus.

Besides the ease with which this thermal chain can be dismantled or set up, and with which the sample 3 and screen 7 can be changed, the thermal chain also offers the following advantages:

It allows, due to the springs 18 and 26, and to the elongated shape of the longitudinal apertures 35, 36, 37 and 38, the disturbing influence of the parasitic expansions, and of the variations in length between the various samples to be eliminated.

It allows for an exact and automatic centering, by means of the ball 23 and of the centering fingers, such as 29, provided with their calibrated springs 30.

It allows for the cancellation of the thermal losses at the hot end, since the contact between this and the remainder of the apparatus is effected between a ball of refractory material and a pusher also of refractory material.

It allows, because of the concept of cooling the cold source by means of temperature controlled water through the star-shaped support 9, the use of pipes which are often very cumbersome and constitute sources of leak to be suppressed or eliminated.

Finally, it allows, because of the water-jacket made of two concentric glass tubes, a total visibility and an appropriate cooling of the envelope of the apparatus.

The operational procedure of such an apparatus when taking a measurement is as follows:

The apparatus is dismantled, and the sample 3 and screen 7 are positioned. This operation is made easy through spring 18 which, when compressed, allows sliding of the screen 6 and screen 7, the latter engaging the cooled pusher 1 easing the positioning and tightening of the sample 3 between witnesses 2 and 5. The spring 18 is then relaxed and the screen 7 already engaged on screen 6 engages the screen 8. The thermocouples and the water-jacket are then installed. A secondary vacuum is then created within the apparatus by means of the pumping assembly and a voltage differential is established between the connecting posts of the resistor 21, while the temperature controlled or thermostated water is circulated within the cold end and the water within the water-jacket.

The comparison between the thermocouples of the screen 7 and of the sample 3 is realized automatically in two proportional registering potentiometers that control, if the need arises, the variation in power distributed to the resistors 45 and 46. The thermal gradients are then similar in the thermal chain sample-witnesses and in the screens. When the temperatures indicated by the thermocouples become constant, the temperature gradients are then recorded by means of a registering potentiometer.

The thermal conductivity K of the sample is then calculated, that of the witnesses 2 and 5 being periodically checked by replacing the sample by a standard and its screen, both being made of the same material, the coefficient of thermal conductivity of which is known, for example, a pure metal.

In a second embodiment of the invention, the thermocouples that provide readings of the temperatures at the surface of the screens 6 and 8 are removed, the collars 43 and 44 are replaced by two interchangeable heating annuli, the centering fingers 29 and the system by means of which the thermocouples are held in place on the sample 3 and on screen 7 are modified, and finally the longitudinal apertures 35, 36, 37 and 38 are replaced by longitudinal slots.

On FIG. 3, are shown one of the two interchangeable heating annuli such as 56, made of refractory material, and three guiding tubes 57, 58 and 59, also of refractory material. The internal diameter of the annulus is very slightly greater than the external diameter of the screen 7, in such a way that it can slide thereon with very little clearance. The guiding tubes 57, 58 and 59 are placed at 120° to each other, around the periphery of the annulus 56, and are slidable in the corresponding holes of the annulus 56, with very little lateral play.

The annulus 56 also contains an auxiliary resistor 45, which is embedded in a refractory cement. Two holes 60 and 61, are provided for the connecting posts of the resistor 45.

The guiding tubes 57, 58 and 59 allow free passage of the thermocouples such as 62 and of their refractory sleeves, such as 63.

Two of the guiding tubes, for example 57 and 58, allow passage of thermocouples such as 62 as far as the surface of the sample 3; the third tube, for example 59, allows passage of a thermocouple as far as the surface of the screen 7.

On FIG. 5, are shown the sample 3 and screen 7, a rod 11, two annuli such as 56, in which slides a guiding tube such as 57 and a guiding tube such as 59. In the tube 57, freely slides a thermocouple such as 62 surrounded by a refractory sleeve 63. In the guiding tube 59, freely slides a thermocouple 64 surrounded by its refractory sleeve 65. The refractory sleeves 63 and 65 are split into two at 66 and 67, which allows bending the assembly sleeve-thermocouple. Referring again to FIG. 5 there is shown a spring 68, comprising a steel blade, secured to a rider 70 by means of screw 69, said rider being attached to rod 11, by means of screw 71. There is also shown on the same figure, a centering finger 72 made up of a rod of which one end has screw threads 73 and a head 74. This head 74 and the screw thread 73 allow for adjustment by screwing of the rider 75, secured by a screw not shown in the figure, on the rod 11, of the centering of the thermal chain.

The spring 68 allows for a continued contact between thermocouples such as 62 and 64, and the surfaces of the sample 3 and of the screen 7. Its easy retraction by rotation around the screw 69 allows for the positioning or removal of the thermocouples such as 62 and 64. The refractory sleeve such as 63 or 65, has a double purpose: that of acting as an insulator and at the same time as a reinforcement for the thermocouple preventing buckling thereof.

Some holes such as 76, on the screen 7 allow for the positioning of some guiding tubes such as 59, which by sliding engage it. The pressure of the spring 68 brings the thermocounple 64 in contact with the screen 7.

Some holes such as 77 allow for the passage through the screen 7, of thermocouple 62 and its sleeve 63; the pressure of spring 68 bringing the thermocouple 62 in contact with the sample 3.

The operation of this second embodiment is analogous to that of the first embodiment. The longitudinal slits replacing the longitudinal openings 35, 36, 37 and 38, allow for an easier assembly of the sample 3 and of screen 7, the possibility of sliding of the screen 6 on the cooled pusher 1, not being restricted anymore to the length of the longitudinal apertures 35, 36, 37 and 38.

In the latter embodiment, the centering of the thermal chain by means of centering fingers 72 is not automatic, but it is realized accurately once and for all with the possibility of rapid readjustment of the centering in case of accidental misadjustment. Finally, the concept of the spring loading of the thermocouples, such as 62 and 64, allows, on the one hand, an accurate positioning, not influenced by the parasitic expansion whether radial or longitudinal and on the other hand a very rapid dismantling and set-up.

The embodiments of the invention in which an exclusive property or privilege is claimed are defined as follows:

1. In an apparatus for measuring the thermal conductivity of a solid material sample by the steady heat flow method, a thermal chain comprising a hot witness, said sample and a cold witness, means for circulating a longitudinal heat flow through the chain, a continuous protection screen surrounding said chain, said screen comprising three separable parts each of said parts surrounding one of said witnesses and said sample, said parts surrounding said witnesses and said witnesses being of the same material, said parts surrounding said sample having a thermal conductivity not exceeding and approximating that of said sample, means for maintaining in said screen the same temperature gradient as in said thermal chain; resilient means for absorbing thermal expansion and length tolerances of said chain; means for measuring the temperature differential between points longitudinally spaced along said thermal chain; means for centering said thermal chain; and insulating means for preventing heat flow from the end of said hot witness away from said sample.

2. Apparatus as described in claim 1 wherein said part of the screen surrounding said sample and said sample are made of the same material.

3. Apparatus as described in claim 1, wherein said means for taking up expansions and the differences in length between samples comprises a pusher contiguous with the cold witness cooled by a circulation of thermostated water and on which slides the final screen, and a calibrated spring bearing on the said screen and ensuring at every instant the necessary amount of pressure for adjusting the various parts of the said screen.

4. Apparatus as described in claim 1 wherein thermal expansion is taken up at the hot end by means of a calibrated spring inserted between the tightening pusher and an adjustment screw and said centering means comprises a combination of centering fingers and a ball of refractory material placed between said tightening pusher and a hot pusher contiguous with said hot witness.

5. Apparatus as described in claim 1, wherein said insulating means comprises a ball of refractory material which acts as a link between the hot pusher and the tightening pusher, said link limiting to one point the contact between the hot pusher and the nonconductive parts of the thermal chain.

6. Apparatus as described in claim 1, wherein the thermocouples intended for the measurement of the thermal gradients of the elements of the thermal chain and of the screen bear against the said elements and screen through the action of springs.

7. Apparatus as described in claim 1, said part of said screen surrounding said sample having a thermal conductivity less than that of said sample and said means for maintaining the same temperature gradient comprising electrical resistor heating means around said screen.

References Cited in the file of this patent
UNITED STATES PATENTS
3,015,234    Springfield _____ Jan. 2, 1962

OTHER REFERENCES

"Apparatus for Measuring Thermal Conductivity of Metals Up to 600C," by Van Dusen et al. J. Research Natl. Bur. Standards 12, April 1934.

"Apparatus for the Measurement of the Thermal Conductivity of Solids," by Weeks et al. The Review of Scientific Instruments 24, November 1953.

"Apparatus for Measuring the Thermal Conductivity of Metals in Vacuum at High Temperatures," by Moss. The Review of Scientific Instruments 26, March 1955.

"A Steady State Method for the Rapid Measurement of The Thermal Conductivity of Rocks," by Beck. J. Scientific Instruments 34, May 1957.